United States Patent [19]
de Benito et al.

[11] Patent Number: 5,258,904
[45] Date of Patent: Nov. 2, 1993

[54] DITHER CONTROL METHOD OF PWM INVERTER TO IMPROVE LOW LEVEL MOTOR TORQUE CONTROL

[75] Inventors: Casilda D. de Benito, Bloomfield; Roy I. Davis, Canton; Richard J. Hampo, Livonia; Prabhakar B. Patil, Southfield, all of Mich.

[73] Assignee: Ford Motor Company, Dearborn, Mich.

[21] Appl. No.: 872,856

[22] Filed: Apr. 23, 1992

[51] Int. Cl.⁵ .................................. H02M 7/5395
[52] U.S. Cl. ...................................... 363/41; 318/811
[58] Field of Search ........................ 363/41; 318/811

[56] References Cited

U.S. PATENT DOCUMENTS

| | | | |
|---|---|---|---|
| 3,783,359 | 1/1974 | Malkiel | 318/254 |
| 4,303,871 | 12/1981 | Berry | 318/138 |
| 4,481,457 | 11/1984 | Zach et al. | 318/811 |
| 4,494,051 | 1/1985 | Bailey | 318/254 |
| 4,528,486 | 7/1985 | Flaig et al. | 318/254 |
| 4,544,868 | 10/1985 | Murty | 318/254 |
| 4,546,293 | 10/1985 | Peterson et al. | 318/254 |
| 4,665,350 | 5/1987 | Angi et al. | 318/254 |
| 4,981,309 | 1/1991 | Froeschle et al. | 280/707 |
| 5,027,048 | 6/1991 | Masrur et al. | 318/806 |
| 5,079,498 | 1/1992 | Cleasby et al. | 323/283 |
| 5,159,542 | 10/1992 | Miller et al. | 363/41 |

FOREIGN PATENT DOCUMENTS

| | | | |
|---|---|---|---|
| 3625913 | 2/1988 | Fed. Rep. of Germany . | |
| 218872 | 12/1983 | Japan | 363/41 |
| 22490 | 2/1985 | Japan | 363/41 |
| 156272 | 8/1985 | Japan | 363/41 |

*Primary Examiner*—William H. Beha, Jr.
*Attorney, Agent, or Firm*—Roger L. May; Mark L. Mollon

[57] ABSTRACT

A pulse width modulated (PWM) inverter is controlled by repetitively changing or dithering desired output currents for the inverter to ensure that it is unable to settle into zero states which result in lack of torque control when the inverter is used to control an AC motor. Dithering is performed by algebraically combining dither values with the desired output currents to generate reference output currents outside a hysteresis band used to control the inverter. Since the reference output currents are outside the hysteresis band, zero states are avoided. Dithering is performed by repetitively adding and subtracting first and second dither values form the desired output currents; or, repetitively adding a first dither value, adding a zero dither value and subtracting a second dither value form the desired output currents. The dither value can be approximately equal to half the hysteresis band, or approximately equal to or greater than half the hysteresis band.

10 Claims, 3 Drawing Sheets

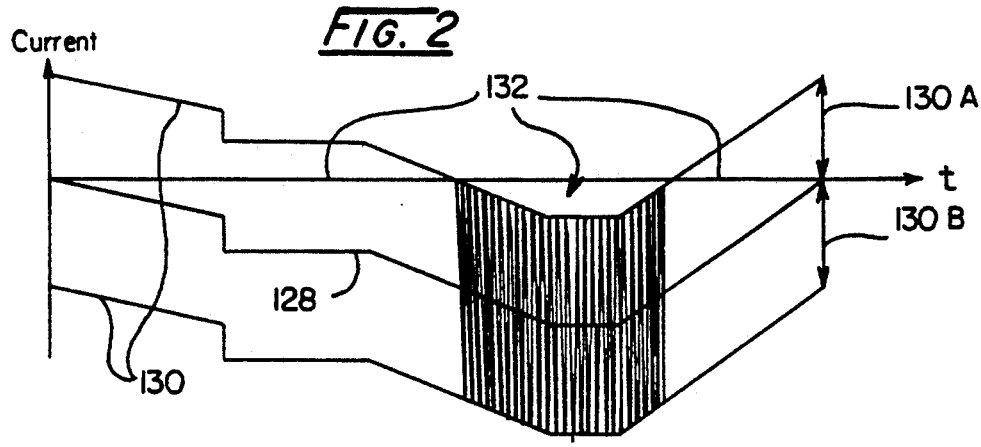
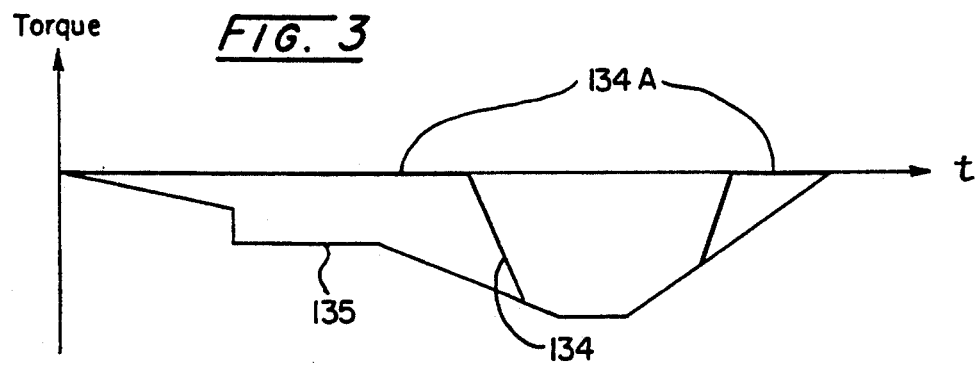
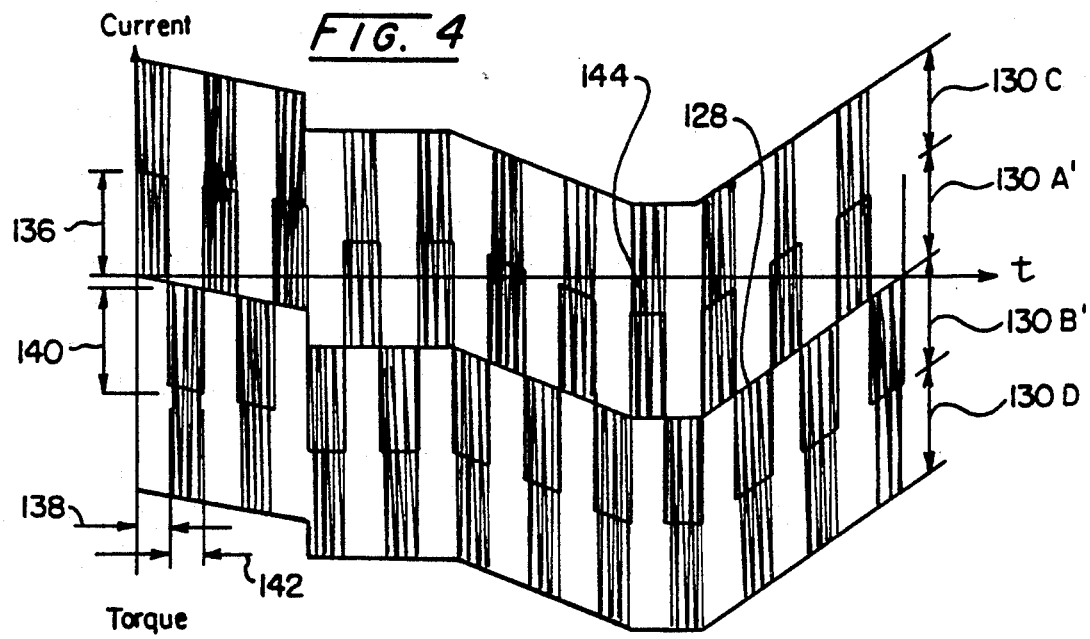
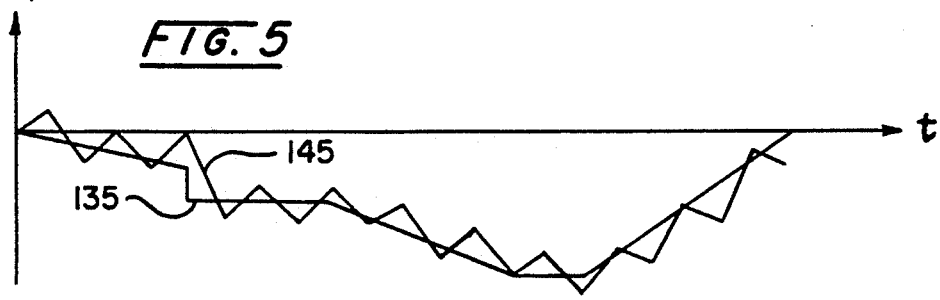

DITHER CONTROL METHOD OF PWM INVERTER TO IMPROVE LOW LEVEL MOTOR TORQUE CONTROL

BACKGROUND OF THE INVENTION

The present invention relates generally to pulse width modulated inverter circuits which can be used in current mode hysteresis controllers to control alternating current (AC) motors that are powered by direct current (DC) power sources such as batteries or rectified AC power through the inverter circuits and, more particularly, to a method of controlling such inverter circuits which results in improved low level torque control when used to control AC motors. While the present invention is generally applicable for controlling inverters for example to drive AC motors having any number of phases, it will be described herein with reference to the control of a three phase AC motor for which it is initially being applied.

AC motors as compared to DC motors are generally of simpler structure and include advantages of lower cost, more compact size, less weight and higher operating efficiencies. However, the complexity and expense of controllers for AC motors has hampered their adoption for use with DC supplies such as batteries and, in particular, for applications in motor vehicles. Simplification of AC motor controllers has resulted from the use of current mode controllers.

For current mode control, currents flowing in the motor are measured and compared to reference current signals which are generated by a motor controller and are representative of motor currents required to effect desired motor operating conditions. Error signals resulting from the comparisons are used to switch semiconductor elements of an inverter circuit which provides power to the motor. In this way, pulse width modulated (PWM) DC power is rapidly switched to control currents flowing in the motor and thereby substantially conform the motor currents to correspond to the reference current signals.

One popular form of current mode control uses hysteresis comparators. In hysteresis current mode control, the actual currents within a motor are maintained within a hysteresis band of given amplitude centered on reference currents which are representative of desired current levels within the motor. An example of hysteresis current mode control for use in a motor vehicle is disclosed in U.S. Pat. No. 5,027,048 which is assigned to the assignee of the present application and is incorporated herein by reference. The hysteresis motor controller of the referenced patent also discloses use of field oriented control which is another important improvement in the control of AC motors.

In hysteresis current mode control, if an actual motor phase current is less than the current defined by its reference current signal, and the difference or error signal is greater than half the hysteresis band, the inverter is configured to connect that motor phase to positive DC power to increase the current flow into the motor. Alternately, if the actual motor phase current is greater than the current defined by its reference current signal, and the magnitude of the difference or error signal is greater than half the hysteresis band, the inverter is configured to connect that motor phase to negative DC power to decrease the current flow into the motor. If the magnitude of the difference between actual and reference currents is less than half the hysteresis quantity, no change is made to the configuration state of the inverter.

Unfortunately, a problem occurs in hysteresis current mode controllers when the reference currents are small. If the reference currents are sufficiently small so that they are within the hysteresis band, all of the motor phases can be connected to either positive DC power or negative DC power which condition is referred to as a zero state. In a zero state, no external voltage is connected across the motor phases, an uncontrolled small current flows and an uncontrolled small torque is produced by the motor. Thus, for a zero state, while the inverter is technically operating properly, the torque produced by the motor is not what is being commanded by the reference current signals.

There is thus a need for improving the low level torque control in AC motors which are controlled by hysteresis mode current controllers.

SUMMARY OF THE INVENTION

This need is met by the improved method for controlling a pulse width modulated (PWM) inverter circuit wherein desired output currents are initially determined for the inverter. For application of the present invention in an AC motor controller, the desired output currents are the AC motor currents required for desired operation of the AC motor. The desired output currents are then dithered to ensure that the inverter circuit is not able to settle into zero states with their resultant lack of current and torque control when the inverter circuit is used to control an AC motor.

Dither, dithered or dithering will be used herein to refer to systematic changes in the desired output currents to generate reference output currents which are not within a hysteresis band used to control the inverter circuit. The changes in the desired output currents are performed by algebraically combining selected current values, which may be referred to herein as dither values, with the desired output currents. Since the reference output currents are not within the hysteresis band, zero states are avoided. Dithering may be performed by adding a first dither value to the desired output current reference for a first period of time; subtracting a second dither value from the desired output current for a second period of time; and, alternating between the addition and subtraction steps.

In another embodiment of the present invention, three steps may be repetitively performed to dither the desired current and thereby arrive at a reference current which is not within the hysteresis band. For the three step method, the steps may comprise: adding a first dither value to the desired current for a first period of time; adding a zero dither value to the desired current for a second period of time; and, subtracting a second dither value to the desired current for a third period of time. The first and second dither or current values used for dithering can be approximately equal to half the hysteresis band, or approximately equal to or greater than half the hysteresis band.

Switching between the two steps or among the three steps of the dithering method of the present invention may be performed on a substantially random basis as long as switching is performed within specified time limits. Such timing can be performed, for example, by performing the switching operation as a part of an operating procedure of an associated control processor, for example during a subloop within the operating procedure. Such subloops are assured of being entered within defined time limits; however, the times between entering the subloops may vary randomly within the defined time limits depending upon the operating load on the processor at a given time.

Alternately, switching can be performed on a substantially periodic basis either under the control of a processor or otherwise. In summary, switching between the two steps or among the three steps of the dithering method may be performed in a periodic or an aperiodic manner, synchronously or asynchronously with respect to the operating procedures of an associated control processor.

In accordance with one aspect of the present invention, a method for controlling a pulse width modulated inverter circuit comprising the steps of: determining a desired output current for the inverter circuit; dithering the desired output current to arrive at a reference output current; sensing output current from the inverter circuit; comparing the reference output current and the sensed output current to one another to generate error signals representative of the differences therebetween; comparing the error signals to upper and lower limits of a hysteresis band; and, switching the state of the inverter circuit whenever the error signals reach the boundaries of the hysteresis band.

The step of dithering the desired output current to arrive at a reference output current may comprise the steps of: adding a first dither value to the desired output current for a first period of time; subtracting a second dither value from the desired output current for a second period of time; and, alternately switching between the steps of adding a first dither value and subtracting a second dither value.

Alternatively, the step of dithering the desired output current to arrive at a reference output current may comprise the steps of: adding a first dither value to the desired output current for a first period of time; adding a zero dither value to the desired output current for a second period of time; subtracting a second dither value from the desired output current for a third period of time; and, repetitively switching through the steps of adding a first dither value, adding a zero dither value and subtracting a second dither value.

The first and second dither values may be selected to approximately equal half of the hysteresis band or may be selected to be approximately equal to or greater than half of the hysteresis band. The first, second and/or third time periods may be randomly selected within time period limits defined by the operating frequency of the inverter circuit, or may be periodic.

It is thus a feature of the present invention to provide an improved method for controlling a pulse width modulated (PWM) inverter circuit for example to improve low level torque control in an AC motor controlled by the inverter circuit; to provide an improved method for controlling a pulse width modulated (PWM) inverter circuit by dithering desired output currents used to control the inverter circuit; and, to provide an improved method for controlling a pulse width modulated (PWM) inverter circuit by dithering desired output currents used to control the inverter circuit by current values or dither values substantially equal to, or substantially equal to or greater than half a hysteresis band used to control the inverter.

Other features and advantages of the invention will be apparent from the following description, the accompanying drawings and the appended claims.

BRIEF DESCRIPTION OF THE DRAWINGS

FIG. 2 shows waveforms illustrating zero state operation of an inverter circuit;

FIG. 3 shows waveforms illustrating torque generation during the zero state operation of FIG. 2;

FIGS. 4 and 5 illustrate operation of an inverter circuit in accordance with a first embodiment of the present invention.

DETAILED DESCRIPTION OF THE INVENTION

Figure 1:
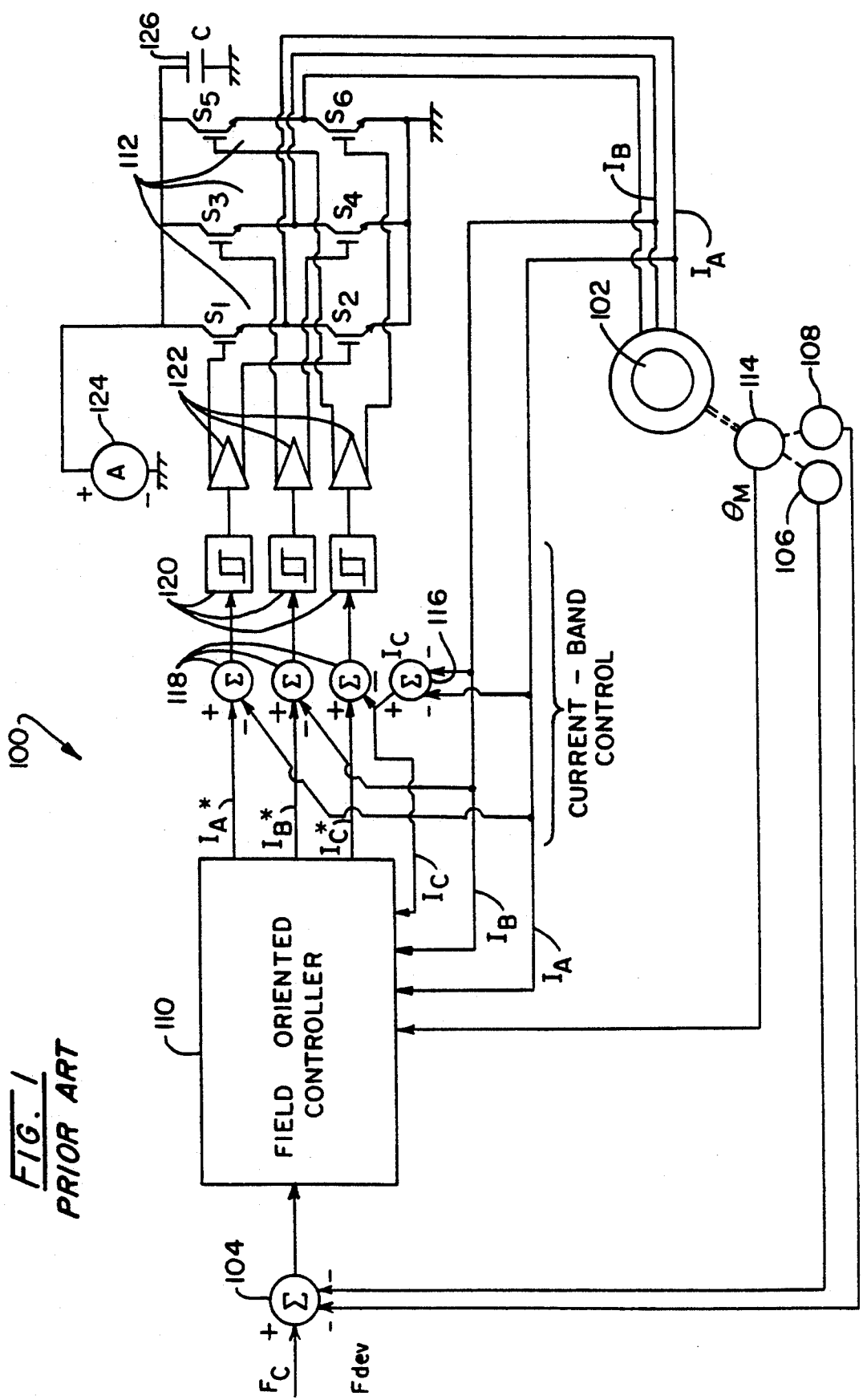
FIG. 1 is a schematic block diagram of an electronic power controller used in an electrically powered active suspension system of the prior art.

While the method of controlling a PWM inverter circuit of the present invention is generally applicable for controlling inverter circuits, it will be described herein with reference to the control of a three phase inverter which is used to control a three phase AC motor. In particular, the method of controlling a PWM inverter circuit of the present invention will be described for use in a current mode hysteresis controller to control three phase AC motors used in an electrically powered active suspension system. FIG. 1 is a schematic block diagram of an AC motor controller 100 used in a prior art electrically powered active suspension system as disclosed in referenced U.S. Pat. No. 5,027,048. One of the AC motor controllers shown in FIG. 1 is associated with each of the wheels of a motor vehicle and is used for controlling a suspension unit provided for each wheel.

A centralized system controller (not shown) in the motor vehicle generates force commands for each of the wheels of the vehicle, such as the force command $F_C$ shown in FIG. 1. The AC motor controller 100 must then supply correct phase currents to AC motor 102, so as to produce the forces specified by the force command $F_C$. A summer or comparator 104 receives the force command $F_C$ from the centralized system controller and adds it to or in other words, compares it with $F_{dev}$. As shown in FIG. 1, $F_{dev}$ is a measured force output derived from load cells 106 or 108 or derived in part by the centralized system controller, using motor current information. The output of the comparator 104 is sent to a field oriented controller 110 which calculates appropriate phase current commands to control the three phase legs 112 which supply the phase currents to the motor 102.

The field oriented controller 110 also receives data from a rotor position sensor 114 which may comprise, for example, an optical encoder. Finally, the field oriented controller 110 senses the currents in the individual windings of the motor 102. Although only the currents $I_A$ and $I_B$ are shown as being sensed directly, with the third current, $I_C$, being derived from currents $I_A$ and $I_B$ by a summer or comparator 116 as the negative of the sum of $I_A$ and $I_B$, those skilled in the art will appreciate that it is possible to directly measure all three of the phase currents as an alternative to the use of the comparator 116.

The field oriented controller 110 calculates the desired phase currents $I_A^*$, $I_B^*$, and $I_C^*$. These desired or idealized phase currents are compared by means of comparators 118 to each of the measured phase currents $I_A$, $I_B$, and $I_C$, respectively. The error or error signal for each current is then fed to current mode controllers 120. The current mode controllers 120 switch phase currents on and off to provide a predetermined hysteretic current level around the desired phase currents $I_A^*$, $I_B^*$, and $I_C^*$. The outputs of the current mode controllers 120 are fed to drivers 122, which supply gate charges for the purpose of switching transistors S1–S6. The transistors S1 and S2, S3 and S4, S5 and S6, which are labeled 112 in FIG. 1, comprise, respectively, phase legs for supplying three separate phase currents from an alternator 124 and/or capacitor 126 to the motor 102. The outputs of the phase legs are fed directly to the motor 102. For additional information regarding operation of the AC motor controller 100 or the suspension system into which it is incorporated, the reader is referred to referenced U.S. Pat. No. 5,027,048.

Under motor operating conditions which result in the generation of desired phase currents or desired output currents outside a hysteresis band used by the current mode controllers 120, currents within the motor 102 are actively controlled resulting in active control of the torque provided by the motor 102. The hysteresis band is simply a boundary above and below the desired phase current within which the actual current is allowed to vary by the action of the current mode controllers 120.

Unfortunately, under normal operating conditions for the motor 102 and with the current mode controllers 120 operating properly, zero states may be encountered. In particular, if the desired phase currents are sufficiently small so that they are within the hysteresis band used by the current mode controllers 120, all of the phases of the motor 102 may be connected to either the positive DC power or the negative DC power, i.e. ground potential in the motor controller 100 of FIG. 1, which are referred to as zero states of motor operation. Zero state operation is schematically illustrated for one current phase in FIG. 2 wherein a desired phase current 128 is shown as being bounded by a hysteresis band 130 with half 130A of the hysteresis band 130 being above the desired phase current 128 and half 130B of the hysteresis band 130 being below the desired phase current 128. The actual phase current 132 is shown as being zero on either side of a central controlled region wherein the actual phase current 132 is controlled to vary about the desired phase current 128 between the boundaries defined by the hysteresis band 130.

When zero states of motor operation are encountered, the current flowing in any given phase winding of the motor 102 will be an uncontrolled function of the motor position and the counter electromotive force (emf) of the motor 102. While zero state operation is technically correct operation of the inverter of the AC motor controller 100, such operation leads to periods of uncontrolled current flow within the motor 102 and therefore uncontrolled torque production by the motor 102 due to an interruption of the normal high frequency on-off switching of the switching transistors S1–S6. FIG. 3 schematically illustrates the uncontrolled or zero torque production by portions 134A of an actual torque curve 134 which corresponds to FIG. 2 and is superimposed onto a desired torque curve 135.

Use of the methods of the present invention results in substantially eliminating zero operating states of the motor 102 and thereby increasing the accuracy of the torque control. In accordance with the methods of the present invention, the desired output currents represented by the desired output current 128 of FIG. 2 are dithered to arrive at reference output currents which are used to control an inverter circuit used, in the illustrated embodiment, in the AC motor controller 100. Dither, dithered or dithering is used herein to refer to the algebraic combination of selected current values, which may be referred to herein as dither values, with desired output currents to arrive at reference output currents which are used to control an inverter circuit for example of the AC motor controller 100.

In accordance with one embodiment of the present invention illustrated in FIG. 4, dithering the desired output currents comprises adding a first dither value 136 to the desired output current 128 for a first period of time 138; subtracting a second dither value 140 from the desired output current 128 for a second period of time 142; and, alternately switching between the adding and subtracting steps. Preferably, the first and second dither values are substantially equal to one another and approximately equal to half the hysteresis band 130. As shown in FIG. 4, the hysteresis band 130 is centered upon the reference output current 144 which oscillates about the desired output current 128 due to the dithering performed in accordance with the present invention.

When the output reference current 144 is above the desired output current 128 due to the addition step of the dithering operation, the hysteresis band 130 comprises an upper half 130C and a lower half 130A'. When the output reference current 144 is below the desired output current 128 due to the subtraction step of the dithering operation, the hysteresis band 130 comprises an upper half 130B' and a lower half 130D. As shown in FIG. 4, preferably the dither value which is added to or subtracted from the desired output current 128 is approximately equal to half the value of the hysteresis band 130.

Alternately, the first and second dither values can be approximately equal to or greater than half the hysteresis band 130. When the dither values are greater than half the hysteresis band 130, the tolerances of the hysteresis band switch point can be somewhat reduced with active control of the inverter circuit still being assured. By making the dither values approximately equal to or approximately equal to or greater than half the value of the hysteresis band 130, the output reference current 144 is substantially assured of being outside the hysteresis band 130 on each switch such that zero states of an inverter circuit are virtually eliminated. As shown in FIG. 4, inverter current flow is constantly maintained to better approximate the desired torque curve 135 of FIGS. 3 and 5 with an actual torque curve 145 of FIG. 5.

Figure 6:
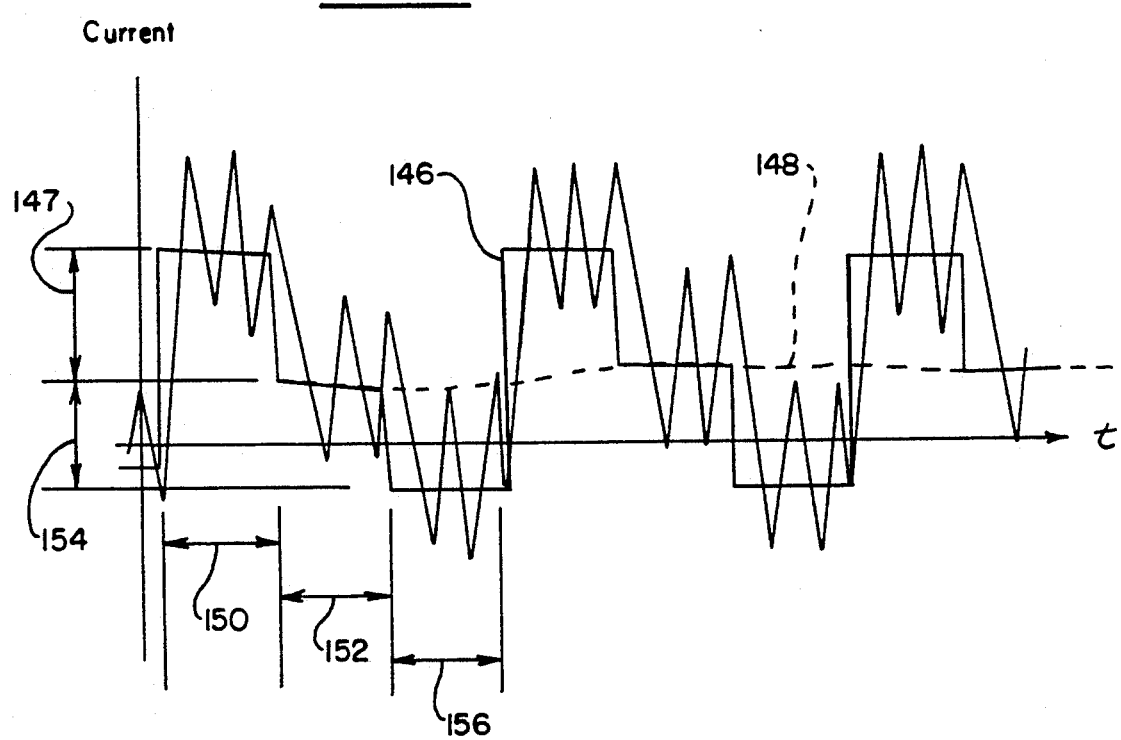
FIG. 6 illustrates operation of an inverter circuit in accordance with a second embodiment of the present invention.

In accordance with a second presently preferred embodiment of the present invention illustrated in FIG. 6, a three step dithering method is used to result in a stair-stepped reference current 146. In this embodiment, dithering the desired output currents comprises adding a first dither value 147 to a desired output current 148 for a first period of time 150; adding a zero dither value to the desired output current 148 for a second period of time 152; subtracting a second dither value 154 from the desired output current 148 during a third period of time 156; and, repetitively switching through the steps of adding a first dither value, adding a zero dither value and subtracting a second dither value. Here again, the first and second dither values preferably are substantially equal to one another and approximately equal to half the hysteresis band.

Alternately, the first and second dither values can be approximately equal to or greater than half the hysteresis band. When the dither values are greater than half the hysteresis band, the tolerances of the hysteresis band switch point can be somewhat reduced with active control of the inverter circuit still being assured.

If the system of FIG. 1 is modified to operate in accordance with the present invention, the dithering operation is performed prior to passing the desired phase currents $I_A^*$, $I_B^*$, and $I_C^*$ to the comparators 118. Preferably the dithering operation would thus be incorporated into the field oriented controller 110 such that the signals passed to the comparators 118 are actually the reference current $I_A^{*'}$, $I_B^{*'}$, and $I_C^{*'}$ signals formed by dithering the desired phase currents $I_A^*$, $I_B^*$, and $I_C^*$.

The dithering operation may be performed, for example, by assigning to each phase current a dither variable which is algebraically combined, i.e. added to or subtracted from, the desired phase currents $I_A^*$, $I_B^*$, and $I_C^*$ each time the desired phase currents $I_A^*$, $I_B^*$, and $I_C^*$ are calculated within the field oriented controller 110. The values of the dither variables are rotated one position for each calculation such that the value of each dither variable for each phase is equal to the value of the dither variable which was last assigned to an adjacent phase.

For example, after the desired phase currents $I_A^*$ and $I_B^*$ have been calculated as illustrated in referenced U.S. Pat. No. 5,027,048 or otherwise, the following dithering operations in accordance with the present invention can be performed to modify the desired phase currents, i.e. to calculate the reference current signals $I_A^{*'}$, $I_B^{*'}$, and $I_C^{*'}$, which are then passed to the comparators 118.

At power up:

DITHER_A = + half hysteresis band

DITHER_B = 0

DITHER_C = − half hysteresis band

For each calculation of the reference currents $I_A^{*'}$, $I_B^{*'}$, and $I_C^{*'}$ which are passed to the comparators 118, the dither values are shifted or rotated by one phase position by performing the following operations.

Set a temporary storage location TEMP = DITHER_C

DITHER_C = DITHER_B

DITHER_B = DITHER_A

DITHER_A = TEMP

The reference currents $I_A^{*'}$, $I_B^{*'}$, and $I_C^{*'}$ are then calculated from the desired phase currents by performing the following operations.

$$I_A^{*'} = I_A^* + \text{DITHER\_A}$$
$$I_B^{*'} = I_B^* + \text{DITHER\_B}$$
$$I_C^{*'} = -I_A^{*'} - I_B^{*'}$$

Since $I_A^{*'}$ and $I_B^{*'}$ already have dither applied to them, the correct dither value is already embedded in this calculation of $I_C^{*'}$. Alternately, if the desired phase current $I_C^*$ is available, $I_C^{*'}$ can be directly computed by performing the operation $I_C^{*'} = I_C^* + \text{DITHER\_C}$.

The foregoing example is for performance of the second presently preferred embodiment of the present invention illustrated in and described above with reference to FIG. 6. Comparable steps for performance of the first embodiment of the present invention illustrated in FIG. 4 should be apparent from this example and accordingly will not be explicitly set forth herein. Further, four our more dither steps could be performed in accordance with the present invention.

The calculation of the reference currents which, for example, are passed to the comparators 118 is preferably performed in a subloop of a control process for controlling the suspension system including the AC motor controller 100. Accordingly, the first and second time periods of the first embodiment and the first, second and third time periods of the second embodiment may be substantially randomly selected within limits defined by the control process for entering the subloop which performs the calculation of the reference currents $I_A^{*'}$, $I_B^{*'}$, and $I_C^{*'}$. Alternately, the calculations of the reference currents $I_A^{*'}$, $I_B^{*'}$, and $I_C^{*'}$ could be performed on a periodic basis.

Where an inverter circuit is used to control an AC motor as illustrated in FIG. 1 which can be modified in accordance with the teachings of the present application to perform the invention of the present application, the period of time between calculations of the reference currents $I_A^{*'}$, $I_B^{*'}$, and $I_C^{*'}$ is determined with respect to the rotating frame of the AC motor which is controlled. For other applications, the first and second time periods of the first embodiment and the first, second and third time periods of the second embodiment are selected within time limits defined by the operating frequency of the controlled inverter circuit. In a working embodiment of the present invention, the inverter circuit operating frequency is approximately 30 kilohertz while the frequency of calculation for the reference currents is approximately 3 kilohertz. In either case, the frequency of calculation of the reference currents $I_A^{*'}$, $I_B^{*'}$, and $I_C^{*'}$ must be greater than the maximum fundamental phase current frequency and lower than the inverter circuit operating frequency in order to improve torque control when used to control an AC motor.

Having thus described the method of the present invention in detail and by reference to preferred embodiments thereof, it will be apparent that modifications and variations are possible without departing from the scope of the invention defined in the appended claims.

What is claimed is:

1. A method for controlling a pulse width modulated inverter circuit comprising the steps of:
   determining a desired output current for said inverter circuit:
   dithering said desired output current to arrive at a reference output current by performing the steps of:
      adding a first dither value to said desired output current for a first period of time;
      adding a zero dither value to said desired output current for a second period of time;
      subtracting a second dither value from said desired output current for a third period of time; and
      repetitively switching through said steps of adding a first dither value, adding a zero dither value and subtracting a second dither value;
   sensing output current for said inverter circuit;
   comparing said reference output current and said sensed output current to one another to generate error signals representative of the differences therebetween;

comparing said error signals to upper and lower limits of a hysteresis band; and switching the state of said inverter circuit whenever said error signals reach the boundaries of said hysteresis band.

2. A method for controlling a pulse width modulated inverter circuit as claimed in claim 1 further comprising the step of selecting said first dither value to approximately equal half of said hysteresis band.

3. A method for controlling a pulse width modulated inverter circuit as claimed in claim 2 further comprising selecting said second dither value to approximately equal half of said hysteresis band.

4. A method for controlling a pulse width modulated inverter circuit as claimed in claim 1 further comprising the step of randomly selecting said first period of time within time period limits defined by an operating frequency of said inverter circuit.

5. A method for controlling a pulse width modulated inverter circuit as claimed in claim 4 further comprising the step of randomly selecting said second period of time within time period limits defined by an operating frequency of said inverter circuit.

6. A method for controlling a pulse width modulated inverter circuit as claimed in claim 5 further comprising the step of randomly selecting said third period of time within time period limits defined by said operating frequency of said inverter circuit.

7. A method for controlling a pulse width modulated inverter circuit as claimed in claim 1 further comprising the steps of:

selecting said first, second and third time periods within time period limits defined by an operating frequency of said inverter circuit; and performing the step of repetitively switching through said steps of adding a first dither value, adding a zero dither value and subtracting a second dither value on a periodic basis.

8. A method for controlling a pulse width modulated inverter circuit as claimed in claim 1 further comprising the step of selecting said first dither value to be approximately equal to or greater than half of said hysteresis band.

9. A method for controlling a pulse width modulated inverter circuit as claimed in claim 8 further comprising the step of selecting said second dither value to be approximately equal to or greater than half of said hysteresis band.

10. A method for controlling a pulse width modulated inverter circuit comprising the steps of;

determining a desired output current for said inverter circuit;

adding a first dither value approximately equal to half of a hysteresis band used to control said inverter circuit to said desired output current to arrive at a reference output current for a first period of time;

adding a zero dither value to said desired output current to arrive at said reference output current for a second period of time;

subtracting a second dither value approximately equal to half of said hysteresis band from said desired output current to arrive at said reference current for a third period of time;

repetitively switching through said steps of adding a first dither value, adding a zero dither value and subtracting a second dither value on a substantially periodic basis;

sensing output current from said inverter circuit;

comparing said reference output current and said sensed output current to one another to generate error signals representative of the differences therebetween;

comparing said error signals to upper and lower limits of a hysteresis band; and switching the state of said inverter circuit whenever said error signals reach the boundaries of said hysteresis band.

* * * * *